Figure 1:
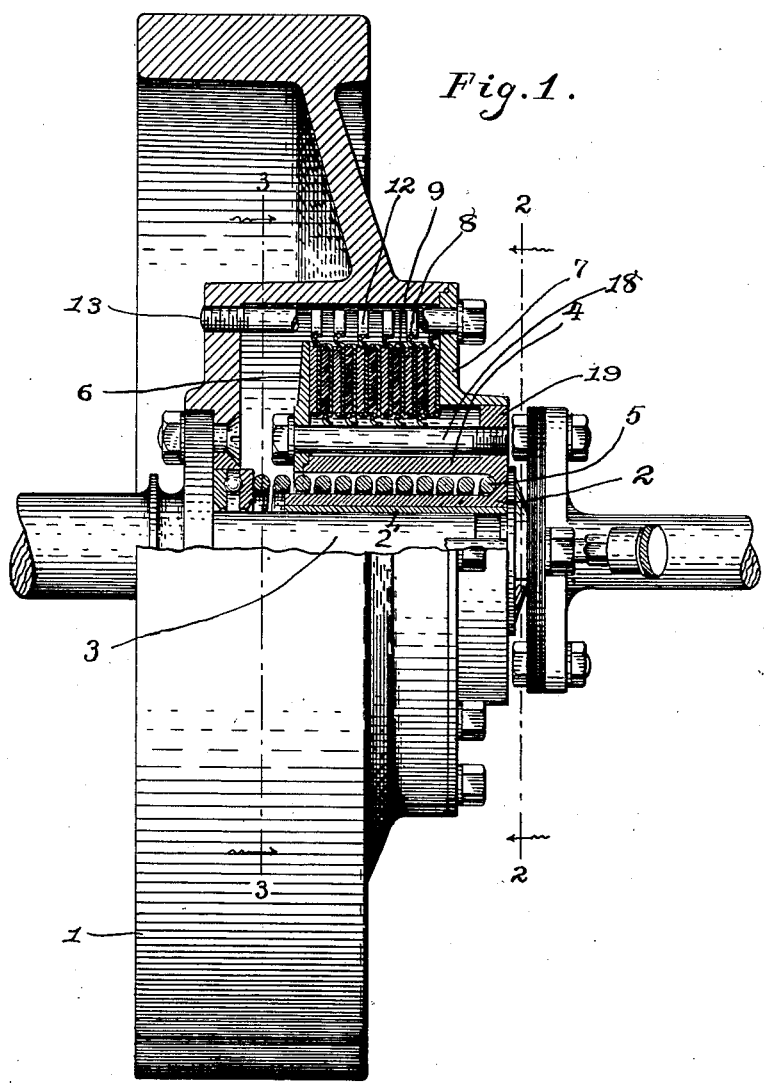

F. I. TONE.
AUTOMOBILE CLUTCH.
APPLICATION FILED MAY 7, 1913.

1,172,502.

Patented Feb. 22, 1916.
2 SHEETS—SHEET 1.

Witnesses,
Chas. N. Leonard,
A. P. Rice.

Inventor,
Fred I. Tone
by Bradford & Doolittle
Attorneys.

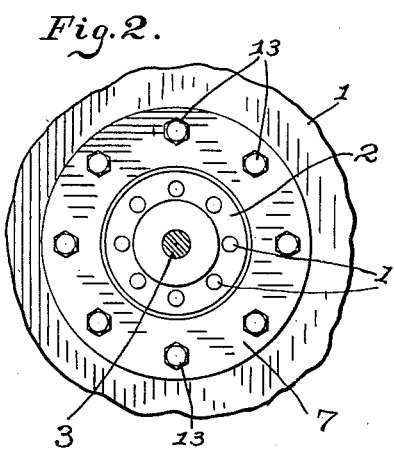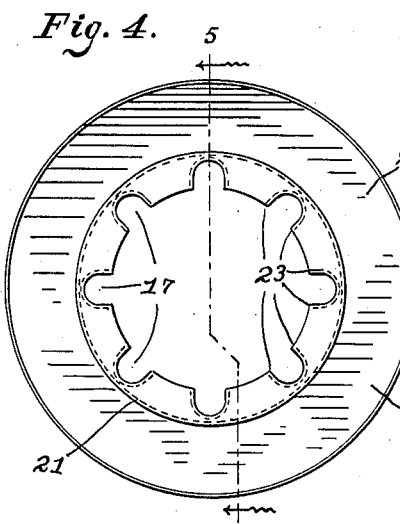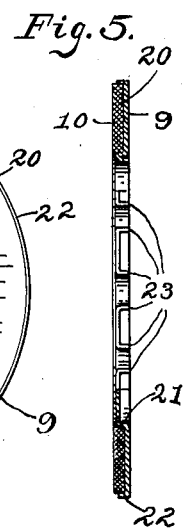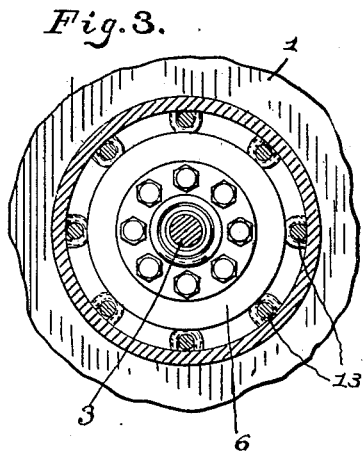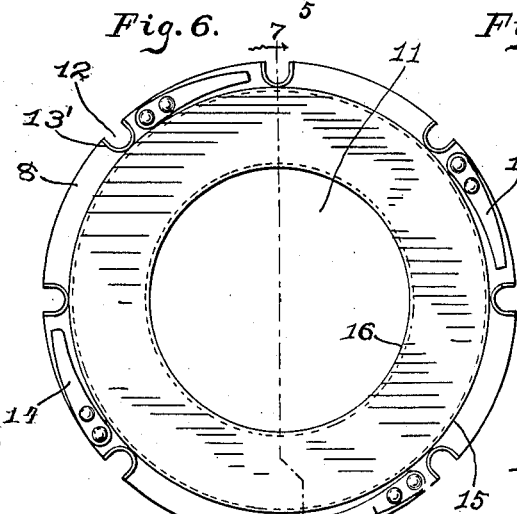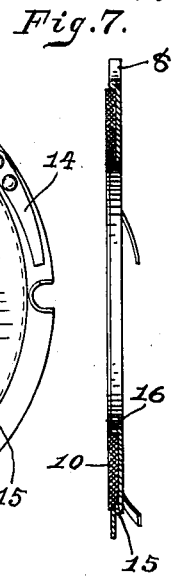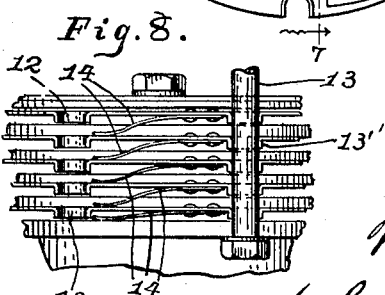

UNITED STATES PATENT OFFICE.

FRED I. TONE, OF INDIANAPOLIS, INDIANA.

AUTOMOBILE-CLUTCH.

1,172,502.          Specification of Letters Patent.      Patented Feb. 22, 1916.

Application filed May 7, 1913. Serial No. 766,223.

*To all whom it may concern:*

Be it known that I, FRED I. TONE, a citizen of the United States, residing at Indianapolis, Marion county, and State of Indiana, have invented and discovered certain new and useful Improvements in Automobile-Clutches, of which the following is a specification.

My invention relates to automobile clutches and its objects are to provide means for utilizing the entire bearing surface of each face of the fibrous sections of the disk clutch, for providing means for holding such fibrous sections in place without the necessity of rivets or bolts passing therethrough, to provide convenient means for receiving the retaining bolts of the clutch parts, to provide a wider bearing surface for the disks against the bolts, whereby wear on the disks at the bolt engaging portions is lessened, and to generally improve the construction of a device of this class.

With these objects in view my invention is embodied in preferable form in the device hereinafter described and illustrated in the accompanying drawings.

In the drawings, Figure 1 is a side view in elevation of the fly wheel, partly in vertical section, showing my invention applied thereto; Fig. 2, is a detail section on line 2—2 looking toward the left of the right hand side of the clutch; Fig. 3, a detail section on line 3—3 of Fig. 1, partly in elevation; Fig. 4, a detail elevation of one of the smaller disks; Fig. 5, a section on line 5—5 of Fig. 4; Fig. 6 a detail elevation of the larger disk; Fig. 7, a section on line 7—7 of Fig. 6; Fig. 8, a detail edge view of clutch disks.

Referring to the drawings, 1 indicates the fly wheel which constitutes the driving member of the mechanism of which the clutch is adapted to form the connecting means and 2 indicates a hub fixed on a bushing which is slidably mounted on the shaft 3. A sleeve 4 is fixed to the hub and between the sleeve and hub is a clutch operating spring 5, operable to force the clutch members together.

At one end of the hub a head 6 is provided, and at the other end of the fly wheel, a head 7 is secured. The clutch members are adapted to be clamped together and against these heads by the movement of the hub. The hub and the parts fixed thereto are adapted to constitute the driven member.

The clutch comprises a series of thin sheet metal disks 8 adapted to engage with the driving member, a series of smaller thin sheet metal disks 9, adapted to engage with the driven member and rings 10 of fibrous material interposed between alternate metal disks of the two series. All the disks are adapted to surround the hub and are confined between the heads 6 and 7. The disks are made of pressed steel, and the retaining and bearing flanges hereinafter described are formed by stamping or pressing the metal laterally out from the body of each of the disks. This arrangement enables the disk of comparatively low cost to be employed and enables a multiplicity of such disks to be used whereby the clutching action is increased and affords means readily and cheaply formed during the process of manufacture for the purpose of providing wide bearings for the supporting means of the disks and suitable retaining means for the fibrous members without thickening the metal of the body of the disks Referring first to the construction of one of the disks 8, it will be seen that the same has a large central aperture 11 adapted to take over the hub 2. In the outer edge of this disk or ring 8, are formed open curved slots or recesses 12, through which are adapted to pass bolts 13, which engage the fly wheel 1. By means of this connection the disks are positively rotated with the fly wheel but are permitted a lateral movement longitudinally of the bolts. Surrounding each of the recesses 12 is a flange 13' which provides a bearing surface against the bolts of greater width than the normal thickness of the disk.

Each of the disks is provided on its inner surface near its outer edge with flat bent springs 14 adapted to have their free ends project inwardly and to bear against the adjacent face of a disk 8 for the purpose of aiding in forcing the disks apart when the clutch is released. Each disk 8 is provided on its outer face with an annular outer flange 15 and an inner flange 16 extending from the inner edge of the disk and in the grooves thus formed is placed loosely an annular fibrous friction member 10 made preferably of woven asbestos.

The disks 9 are mounted alternately with respect to the disks 8, each of the disks 9 being carried between two large disks 8. The disks 9 are smaller than the disks 8 and their outer edges are adapted to extend out flush with the perimeters of these fibrous rings 10 that are carried by disks 8. These smaller disks have central apertures adapted to take over the hub 2 and are provided at their inner edges with slots or curved recesses 17 which engage bolts 18 extending through the head 6 and into flange 19 at the other end of the hub. A groove 20 is formed in the outer face of each of the disks 9 by means of outwardly projecting annular flanges 21 and 22. In the groove thus formed is seated one of the fibrous rings 10 made, as before stated, preferably of woven asbestos. A flange 23 is provided at the edge of each recess 17 in order to provide wide surfaces to bear against the bolts 18.

It will be seen that with the above arrangement the fibrous clutch members are loosely mounted so as to constitute what may be called floating clutch members. By this arrangement the use of rivets or screws for fastening the fibrous sections to the metal sections is avoided, thereby obviating the loss of frictional surface occasioned by the use of such fastening means and giving a continuous uninterrupted frictional bearing surface of the two flat faces of the fibrous rings.

The flanges which surround the borders of the bolt recesses in the metal disks also provide wider bearing surfaces than the thickness of the disk would afford and thus tend to prevent the disks from wearing grooves in the bolts.

In the operation of the device when the hub is pushed outwardly, the disks will be forced apart and the clutch released, the springs 14 aiding in this movement.

On the release of the hub the springs 14 will aid in forcing the disks apart, and the spring 5 will force the hub outwardly and clamp the driving and driven disks together, the frictional fibrous rings being clamped against the adjacent faces of the disks.

Having thus described my invention, what I claim is:

1. In an automobile clutch, in combination with a thin sheet metal disk, said disk having laterally extending flanges pressed out from the metal thereof on one face of the same and forming a groove and an annular fibrous member seated loosely in said groove, substantially as described.

2. In an automobile clutch, in combination with a series of thin sheet metal disks, a series of bolts on which said disks are laterally movable, said disks having lateral flanges pressed out from the body of the disks and bearing against said bolts, substantially as described.

3. In an automobile clutch, in combination with two series of thin sheet metal disks, members of frictional material between adjacent disks of different series, an outer series of bolts on which one series of disks are laterally movable, an inner series of bolts on which the other set is laterally movable, the disks of the respective series having outer and inner pressed out lateral flanges forming bearing portions which bear against said bolts.

In witness whereof, I have hereunto set my hand and seal at Indianapolis, Indiana, this 28th day of March, A. D. nineteen hundred and thirteen.

FRED I. TONE. [L. S.]

Witnesses:
A. C. RICE,
H. P. DOOLITTLE.